US010635336B1

(12) United States Patent
He et al.

(10) Patent No.: US 10,635,336 B1
(45) Date of Patent: Apr. 28, 2020

(54) CACHE-BASED PARTITION ALLOCATION

(71) Applicant: Amazon Technologies, Inc., Seattle, WA (US)

(72) Inventors: Hao He, Seattle, WA (US); David Alan Lutz, Renton, WA (US); Andrew Whitaker, Seattle, WA (US); Yosseff Levanoni, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/382,382

(22) Filed: Dec. 16, 2016

(51) Int. Cl.
*G06F 3/06* (2006.01)
*G06F 12/0813* (2016.01)

(52) U.S. Cl.
CPC ........ *G06F 3/0631* (2013.01); *G06F 3/0604* (2013.01); *G06F 3/067* (2013.01); *G06F 3/0644* (2013.01); *G06F 12/0813* (2013.01); *G06F 2212/154* (2013.01); *G06F 2212/60* (2013.01); *G06F 2212/62* (2013.01)

(58) Field of Classification Search
CPC ...... G06F 3/0631; G06F 3/067; G06F 3/0604; G06F 12/0813; G06F 3/0644; G06F 2212/60; G06F 2212/62; G06F 2212/154
See application file for complete search history.

(56) References Cited

U.S. PATENT DOCUMENTS

| | | | | |
|---|---|---|---|---|
| 6,047,356 A | * | 4/2000 | Anderson | G06F 12/0866 707/999.104 |
| 6,314,501 B1 | * | 11/2001 | Gulick | G06F 9/54 711/153 |
| 2015/0067281 A1 | * | 3/2015 | Jones | G06F 12/0284 711/156 |
| 2015/0269239 A1 | * | 9/2015 | Swift | G06F 16/27 707/610 |
| 2016/0026667 A1 | * | 1/2016 | Mukherjee | G06F 16/2282 707/714 |
| 2017/0316027 A1 | * | 11/2017 | Mondal | G06F 17/30138 |

* cited by examiner

*Primary Examiner* — Francisco A Grullon
(74) *Attorney, Agent, or Firm* — Davis Wright Tremaine LLP

(57) ABSTRACT

A distributed system may comprise a plurality of computing nodes, each of which may provide computing capacity for operating various computing services. The system may maintain a memory-based store of records representative of capacity available on the computing nodes. A record indicative of a computing node having a requested amount of capacity may be selected. The record may be modified to indicate that the computing node is a candidate for providing the requested amount of capacity. Upon receiving information confirming that the computing node has been configured to provide the requested capacity, the record may be modified to indicate that the computing node has committed to provide the requested capacity.

20 Claims, 9 Drawing Sheets

CACHE-BASED PARTITION ALLOCATION

BACKGROUND

Distributed computing systems may host a variety of applications and services. Typically, a distributed computing system may comprise a large and heterogeneous mixture of computing devices. Each individual computing node may operate a number of these applications and services. The computing demands placed upon each computing node may vary, depending on the nature of the application or service. Moreover, these demands may evolve over time.

One issue that may arise in the operation of a distributed computing system is identifying computing devices suitable for hosting a requested application or service. Typical approaches to this issue may involve identifying a least-burdened computing device and assigning to it responsibility for hosting a new application or service

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Disclosed herein are systems, methods, and computer program products pertaining to distributed computing systems. Embodiments of the present disclosure may involve systems, methods, and computer program products pertaining, for example, to the allocation of computing capacity delivered by a fleet of computing nodes.

In an embodiment, a distributed database system receives a request to allocate a computing node to provide computing capacity for maintaining a database partition. The request may comprise a criterion for selecting a computing node with a characteristic, such as a storage device type, processor speed, or amount of memory, suited for use with the database partition.

In an embodiment, the distributed database system maintains a singleton instance of an in-memory cache that is representative of all computing nodes available to host the partition, i.e. all nodes in the fleet of available computing nodes. A computing node suited to host the partition may be selected by forming a ranked list of at least a subset of the records in the cache. The records may be ranked based on the criterion and the amount of capacity believed to be available on the node. A candidate node may be selected from the ranked list. Randomization techniques may be employed to improve the distribution of allocations.

In an embodiment, the distributed database system may modify the cached record to indicate that the corresponding computing node is a candidate for hosting the partition. This may be described as soft-reserving the computing node to host the partition. The distributed database system may then cause the computing node to be configured to host the partition. This may, for example, comprise copying partition data to the computing node and checking that the computing node has sufficient capacity to host the partition. Note that in some instances, the demands placed on the computing node by existing partitions may evolve over time, such that prior estimates of the amount of capacity available on the node may be inaccurate. If the computing node is successfully configured to maintain the partition, and if sufficient computing capacity remains available, the computing node may confirm that it is able to maintain the partition.

In an embodiment, the distributed database system may, based on the confirmation, modify the record to indicate that the soft-reserved capacity has been committed. The record may, for example, be modified to adjust its representation of the amount of available capacity to reflect what had been soft-reserved capacity.

In an embodiment, the distributed database may periodically initiate a sweep of the computing nodes to obtain capacity information, determine whether attempts to commit soft-reserved capacity have failed, and so forth. In some instances, the aforementioned confirmation may be obtained during this sweep.

Figure 1:
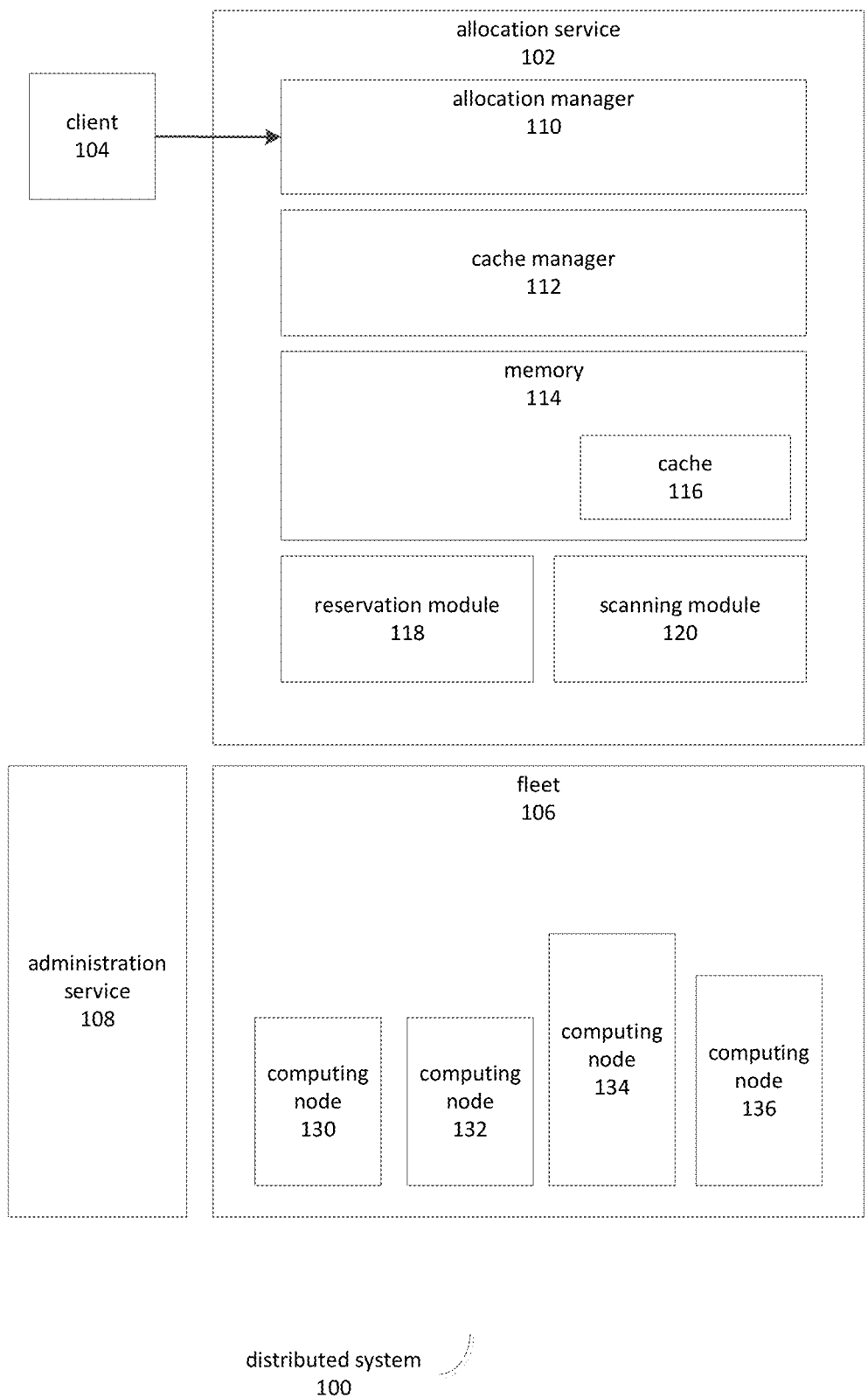
FIG. 1 is a block diagram depicting an example of a distributed computing system.

FIG. 1 is a block diagram depicting an example of a distributed computing system. In an embodiment, a distributed computing system 100 may comprise a fleet 106 of computing nodes 130-136. The fleet 130-136 may provide computing services on behalf of various clients.

In an embodiment, the fleet 106 may comprise a number of computing nodes 130-136. In a further aspect, the computing nodes 130-136 may each host a number of database partitions. Hosting a database partition may comprise dedicating an amount of computing capacity to the partition, to be able to respond to requests to store and retrieve data.

In an embodiment, computing capacity may comprise input/output operations. In a further aspect, computing capacity may be quantified at a rate at which input/output operations are performed. For example, computing capacity may be quantified as a number of input/output operations per unit of time (e.g., operations per second), or as an amount of data that may be processed per unit of time.

In an embodiment, computing capacity may comprise consumption of storage capacity. For example, in some embodiments a computing node 130-136 might host a database partition consuming some amount of storage space on a storage device to which the corresponding node 130-136 is connected.

The foregoing examples of computing capacity are intended to be illustrative, and should not therefore be seen as limiting the scope of the present disclosure. In some embodiments, computing capacity may involve and/or be quantified in variety of ways. Other examples include, but are not limited to, central processing unit utilization, network utilization, memory utilization, and so forth.

In an embodiment, an administrative client device 104 may request that additional computing capacity be reserved. The request may, for example, be a request for one of the nodes 130-136 to reserve capacity for hosting an additional database partition. In an embodiment, the request may be to reserve capacity on one of the nodes 130-136 for host some other type of service.

In an embodiment, an allocation service 102 may process requests to reserve computing capacity. For example, the administrative client device 104 may send a request to reserve computing capacity to the allocation service 102. The allocation service 102 may process the request by identifying a suitable node 130-136 of the fleet 106, and by causing the selected node 130-136 to be configured to provide the capacity.

In an embodiment, the fleet 106 may comprise heterogeneous computing nodes 130-136. The nodes 130-136 may have various properties differing between nodes 130-136. For example, a subset of nodes 130-134 might comprise storage devices of a particular type, such as solid-state drives, while another subset of the nodes 136 might comprise storage devices of another type, such as disk drivers. Other examples include, but are not limited to properties such as number of processors, processor speed, amount of random-access memory, and so forth.

In an embodiment, a request issued by the administrative client device 104 may specify a criterion applicable to its request to provide additional computing capacity. The criterion may, for example, refer to a property of a computing node 130-136. The allocation service 102 may select a computing node to provide the service based on the criterion. In an embodiment, the allocation service 102 selects a computing node 130-136 so that it conforms to the criterion. For example, a request to provide additional computing capacity may include a criterion indicating that the request should be fulfilled using a computing node 130-136 that has a solid-state drive.

In an embodiment, each node 130-136 of the fleet 106 may have a changing amount of computing capacity which it may provide. For example, a given computing node 130 might initially host some number of previously allocated database partitions. At a given time, these database partitions might provide some amount of computing capacity, which could be designated as capacity X. To provide an additional amount of computing capacity, designated as Y, the total capacity of the computing node 130 might be such that $X+Y=T$, where T is the total capacity which the computing node 130 can provide. However, it might be the case that X varies over time as the existing database partitions grow. Accordingly, it might be required that $X+\Delta X+Y=T$, where $\Delta X$ is the additional capacity consumed by the existing partitions.

In an embodiment, the allocation service 102 may comprise an allocation manager 110, a cache manager 112, a reservation module 118, and a scanning module 120.

In an embodiment, the allocation manager 110 may receive requests to provide computing capacity from the client 104. The allocation manager may serialize processing of the requests. Serialization may refer to processing the requests sequentially to some stage of completion. In some cases, serialization may include processing the requests in the order received, but various embodiments may use other orderings, such as random, priority-based, and so forth.

In an embodiment, the cache manager 112 may maintain a cache 116 in a memory 114. In a further aspect, the cache manager 112 and its corresponding cache 116 are singleton instances. In other words, a single cache manager 112 may maintain a single cache 116 for the allocation service 102. The cache manager 112 may maintain data for all the nodes 130-136 which make up the fleet 106 in the singleton cache 116. As noted above, the allocation manager 116 may serialize processing of requests to reserve computing capacity. In various aspects, access to the cache 116 may also be serialized, so that a single request for computing capacity is processed using cache data any one time.

In an embodiment, the cache manager 112 may maintain, in the cache 116, a record corresponding to each of the nodes 130-136 in the fleet 106. Each record may be indicative of various properties of the node that corresponds to the record. For example, a record in the cache 116 might comprise data indicating current capacity utilization, maximum capacity utilization, and various property indicators that may be matched to a criterion specified in the request for computing capacity.

In an embodiment, the cache manager 112 may select a subset of the nodes records in the cache 116. The selected records may correspond to a set of nodes 130-136 selected as candidates for providing the additional requested computing capacity. In a further aspect, the selection may be with respect to a criterion supplied with the request. The selection may also, in various aspects, be randomized so that the selected subset may vary with each selection.

In an embodiment, the cache manager 112 may rank the selected subset of records. In a further aspect, the cache manager 112 may select a record based on the ranking. For example, the highest-ranked record may be selected, or a randomization technique may select from among the top-ranked records.

In an embodiment, the cache manager 112 may mark the record in the cache 116 to indicate that the corresponding node has been "soft-reserved." A soft reservation may refer to a node that has been tentatively allocating responsibility to provide a requested amount of computing capacity, but that has not yet confirmed its ability to provide the capacity. As noted above, the computing capacity that a node may be able to provide can vary over time. For example, a node hosting various partitions may have decreasing additional capacity available for a new partition, since the workload associated with the initial set of partitions may increase over time. The cache 116 may therefore not have a fully accurate representation of the amount of capacity that a given node can provide. In addition, a request to provide computing capacity may not, in all instances, be accompanied by a precise indication of how much capacity is needed. For example, in an embodiment a request might be made to host a new partition, without precise indications of how large the partition is or how many input/output operations it requires. Accordingly, the soft reservation marked on the record may be a tentative reservation that may be subsequently committed or rolled back. The allocation manager 110 or cache manager 112 may thus mark the record to indicate that the corresponding node is soft-reserved, and then initiate a process to configure the node to provide the requested computing capacity.

In an embodiment, the allocation manager 110 or cache manager 112 may send instructions to configure a node to a reservation module 118. The reservation module 118 may respond to the request by initiating configuration operations on a selected node. For example, the reservation module 118 may initiate copying of database partition data to the selected node.

In an embodiment, the reservation module 118 may determine that the soft-reserved computing node has been configured to provide the requested computing capacity, or that the soft-reserved node was already able to provide the requested computing capacity.

In an embodiment, the reservation module 118 may cause the selected, soft-reserved computing node to switch to a "hard reserved" state with respect to providing the requested computing capacity. For example, in response to determining that the soft-reserved computing node has been successfully configured to provide the computing capacity, the reservation module 118 may update data maintained on the soft-reserved node to indicate that the reservation is permanent.

In an embodiment, the soft-reserved node may transition to a hard-reserved state when the requested computing capacity is activated. For example, if the requested computing capacity involved the hosting of a database partition, the hard-reservation might be committed by activating the database provision. In other instances, the hard-reserved state may commence once the soft-reserved computing node begins providing the requested computing capacity.

In an embodiment, each of the computing nodes comprises a reservation module 118. In aspects of this embodiment, the allocation module 110 or cache manager 112 transmits instructions to configure a computing node to provide a requested computing capacity.

In an embodiment, one or more additional computing nodes comprise one or more reservation modules 118, which in turn communicate with selected soft-reserved computing nodes to perform configuration operations and to cause the nodes transition to a hard-reserved state.

In an embodiment, an administrative service 108 may perform operations related to the configuration of the fleet 106, including those related to configuring a node 130-136 to provide requested computing capacity. The operations may include facilitating the copying of database partition data, installation of program executables, data and metric collection, and so forth.

In an embodiment, the scanning module 120 may perform operations that collect data from the nodes 130-136 of the fleet 106. These may be described as a scanning operation. In the scanning operation, a message may be sent to each node 130-136 of the fleet 106 requesting that it provide information comprising operational status, capacity utilization metrics, estimates of available capacity, and various properties that might be specified as criteria in a request for computing capacity. The sweep may also obtain information from each node indicating whether any existent soft reservations may be converted to hard reservations.

In an embodiment, the cache manager 112 receives information from the sweep and uses it to update the cache 116. The cache manager 112 may modify records corresponding to soft-reserved computing nodes to indicate that the reservation was successful or to roll back the soft reservation. In the case of a successful transition to a hard-reserved state, the cache manager 112 may update the corresponding record to indicate current estimates of available computing capacity, and to indicate that the corresponding computing node may again be soft-reserved.

In an embodiment, communication of reservation status may be communicated via remote procedure calls. In one aspect, a computing node 130-136 which has been designated as a candidate for providing computing capacity may invoke a remote procedure call to indicate that the reservation of the capacity has been successfully committed. For example, a computing node 130-136 may invoke a remote procedure call directed to the reservation module 118 or cache manager 112 to indicate that it has completed all preparations needed to ensure that it can provide the requested amount of computing capacity. In another aspect, the computing node 130 may invoke a remote procedure call directed to administration service 108, which may then in turn communicate the commitment to the reservation module 118 or cache manager 112.

Figure 2:
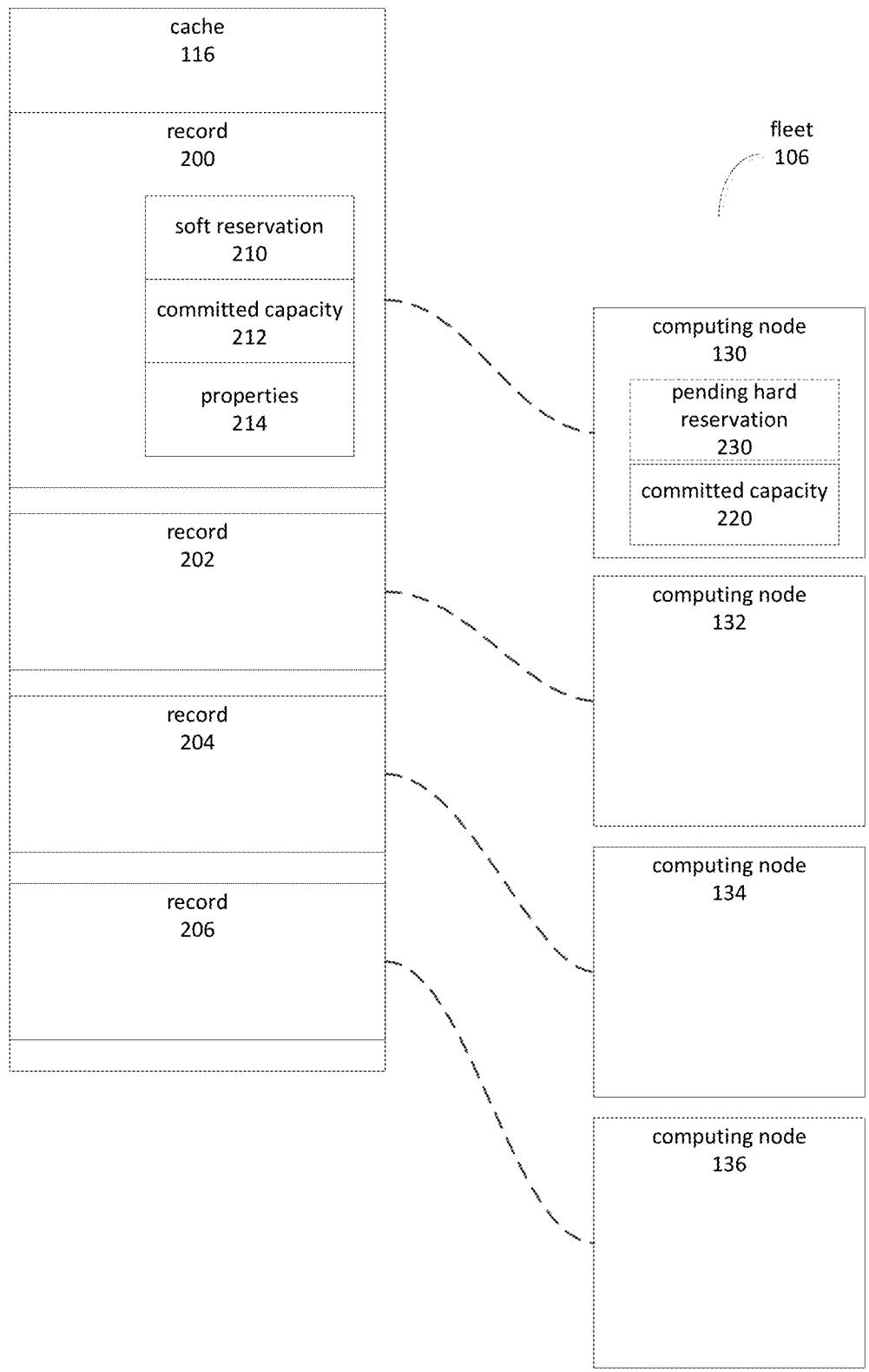
FIG. 2 is a block diagram depicting an example of a cache for partition allocation.

FIG. 2 is a block diagram depicting an example of a cache for partition allocation. A cache 116 may comprise records 200-206. Each record 200-206 may correspond to a computing node 130-136. In an embodiment, the cache 116 comprises one record 200-206 for each computing node 130-136 in a fleet 106, so that all available computing nodes are represented in the cache. In an embodiment, all computing nodes having at least some amount of excess capacity are represented in the cache.

In an embodiment, a record 200 may comprise a field 210 indicating that it is associated with a soft reservation of the corresponding computing node 130. A soft reservation may refer to the corresponding computing node 130 being a candidate for providing a requested amount of computing capacity. The soft reservation may, in an embodiment, persist until either confirmed or rolled back.

In an embodiment, the record 200 may comprise committed capacity 212 field. This may correspond to the committed capacity 220 of the computing node 130, but may be inaccurate or out-of-date.

In an embodiment, the record 200 may also comprise properties 214. The properties 214 may include data describing various aspects and features of the corresponding computing node 130, such as storage type, processor speed, available memory, and so forth. The properties 214 may, in some embodiments, be compared to criteria specified in a request to provide computing capacity.

The additional records 202-206 in the cache 116 may comprise similar fields similar or identical to those depicted as being elements of the first record 200.

In an embodiment, the corresponding computing node 130 may receive a request to implement a soft-reserved amount of computing capacity. The computing node 130 may store data indicative of a pending hard reservation 230. The computing node may then perform or be subjected to various operations for configuring the computing node 130 to provide the soft-reserved capacity.

In an embodiment, the computing node 130 may maintain data indicative of committed capacity 220. The computing node 130 may, for example, monitor the capacity used to maintain its existing set of database partitions. When a pending hard reservation 230 commits, the resources associated with that reservation may be included in the calculation of committed capacity 220.

In an embodiment, committing a soft reservation of capacity may comprise adding a requested amount of data storage to an amount of storage already in use.

In an embodiment, committing a soft reservation of capacity may comprise adding a requested amount of input/output operations per unit of time to a current rate of input/output operations.

Figure 3:
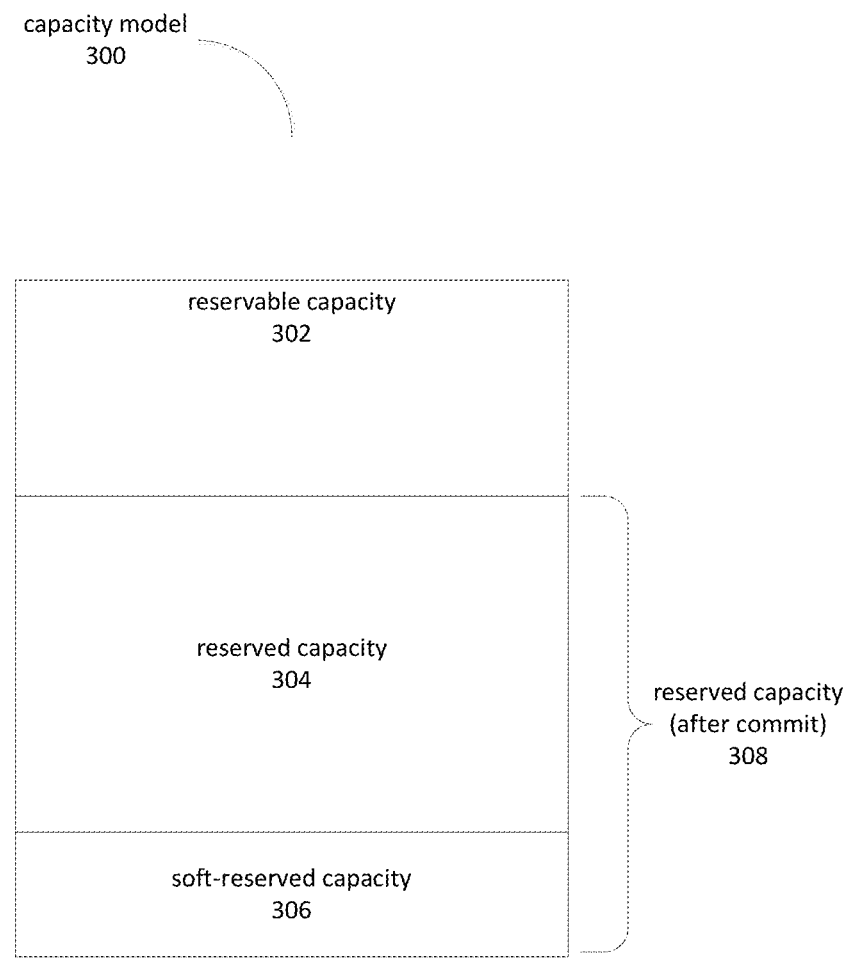
FIG. 3 is a block diagram depicting a capacity model for a computing node.

FIG. 3 is a block diagram depicting a capacity model for a computing node. In an embodiment, a cache 116 may maintain fields comprising aspects of the depicted capacity model 100. An allocation manager 110 and/or cache manager 114 may utilize aspects of the model to identify candidates for providing requested computing capacity.

In an embodiment, a capacity model 300 may comprise a reservable amount of capacity 302. The reservable capacity 302 may refer to a total amount of some measure of capacity. For example, total available storage capacity or total permitted input/output operations per unit of time may be quantified. These totals may in turn be based on physical or operational characteristics of the computing node and any relevant infrastructure.

In an embodiment, the capacity model 300 may further comprise a reserved capacity 304. The reserved capacity 304 may include capacity utilized in providing computing capacity that the node has already committed to provide. The reserved capacity 304 may be referred to as hard-reserved capacity.

In an embodiment, the capacity model 300 may further comprise a soft-reserved capacity 306. The soft-reserved capacity 306 may include a tentative reservation or allocation of the capacity of a computing node. The soft-reserved capacity may, in some instances, correspond to an estimate of the capacity that will be consumed by adding a database partition or other computing service to a computing node. The soft-reserved capacity may be referred to as uncommitted capacity utilization or tentative capacity utilization.

In an embodiment, soft-reserved capacity 306 may be committed when it becomes certain that a computing node is able to provide the requested amount of computing capacity. When the soft-reserved capacity 306 is committed, it may be combined with the reserved capacity 304, resulting in a larger amount of reserved capacity 308.

Figure 4:
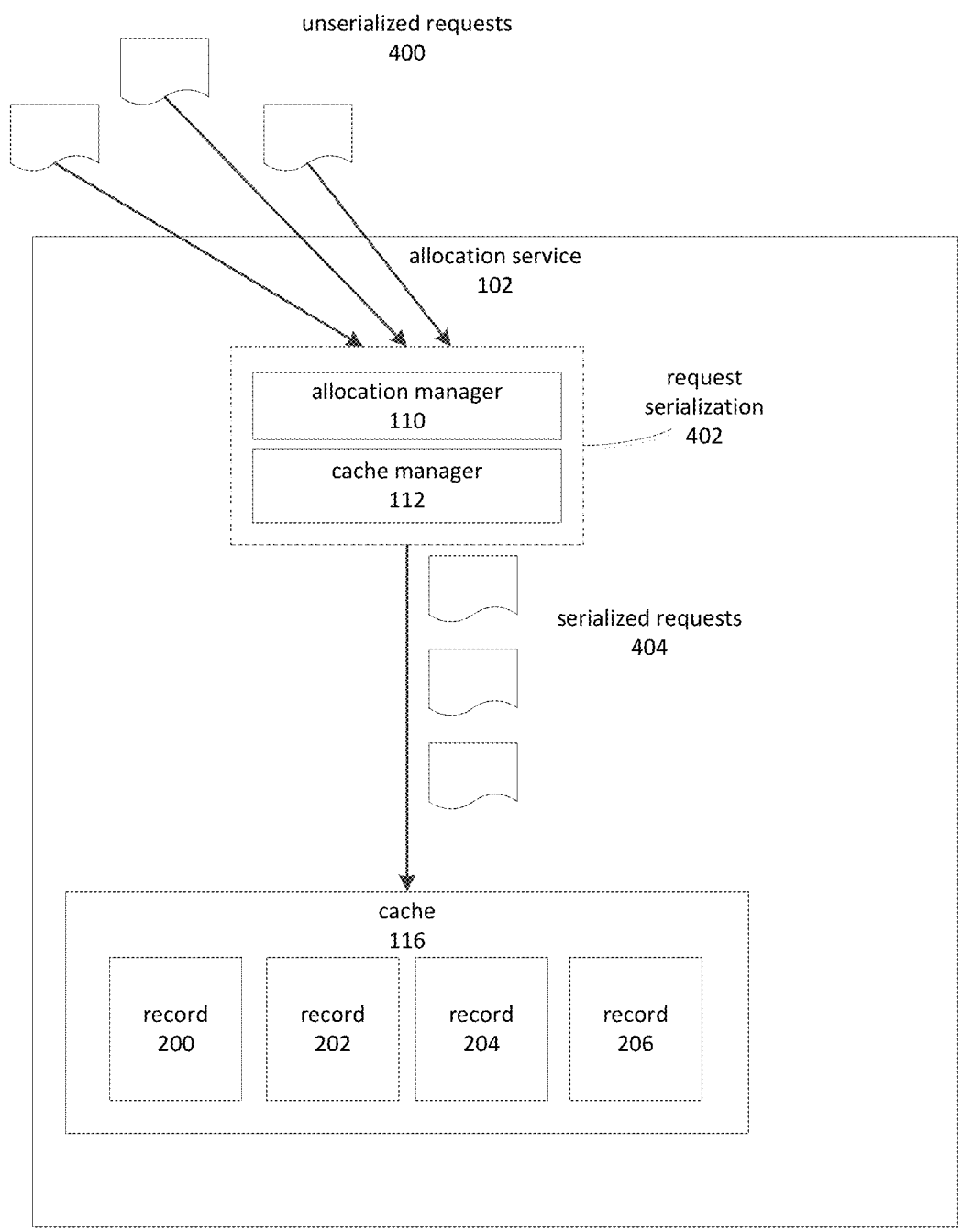
FIG. 4 is a block diagram depicting an example of request serialization.

FIG. 4 is a block diagram depicting an example of request serialization. In an embodiment, serial processing of requests may comprise responding to requests to provide capacity in sequential order, such that processing of a first request is completed before processing of a second request begins.

In an embodiment, processing a request for capacity may comprise accessing the cache 116 to identify a subset of suitable candidate nodes, selecting one of the subset, and marking the node as being soft-reserved. Serial processing of the next request may proceed after a node is marked in the cache as being soft-reserved.

In an embodiment depicted by FIG. 4, various unserialized requests 400 may be sent to the allocation service 102. The allocation manager 110 and/or cache manager 112 may receive the unserialized requests 400 and apply request serialization 402 to the received requests. The depicted request serialization 400 block in FIG. 4 refers to aspects of the allocation manager 110 and/or cache manager 112 that may cause the unserialized requests 400 to be processed as serialized requests 404. For example, the allocation manager 110 and/or cache manager 112 may place received unserialized requests 400 into a first-in, first-out queue. Requests may then be withdrawn from the queue and processed in serial order.

In an embodiment, the cache 116 and associated components, such as an allocation manager 110 and/or cache manager 112, may be implemented as singleton instances. The allocation manager 110 and/or cache manager 112 may access a singleton instance of the cache 116. The cache 116 may be representative of the entire fleet 106 of computing nodes. The combination of a singleton instance and serialized access may increase efficiency of the allocation by, for example, eliminating locks and other complexities.

Figure 5:
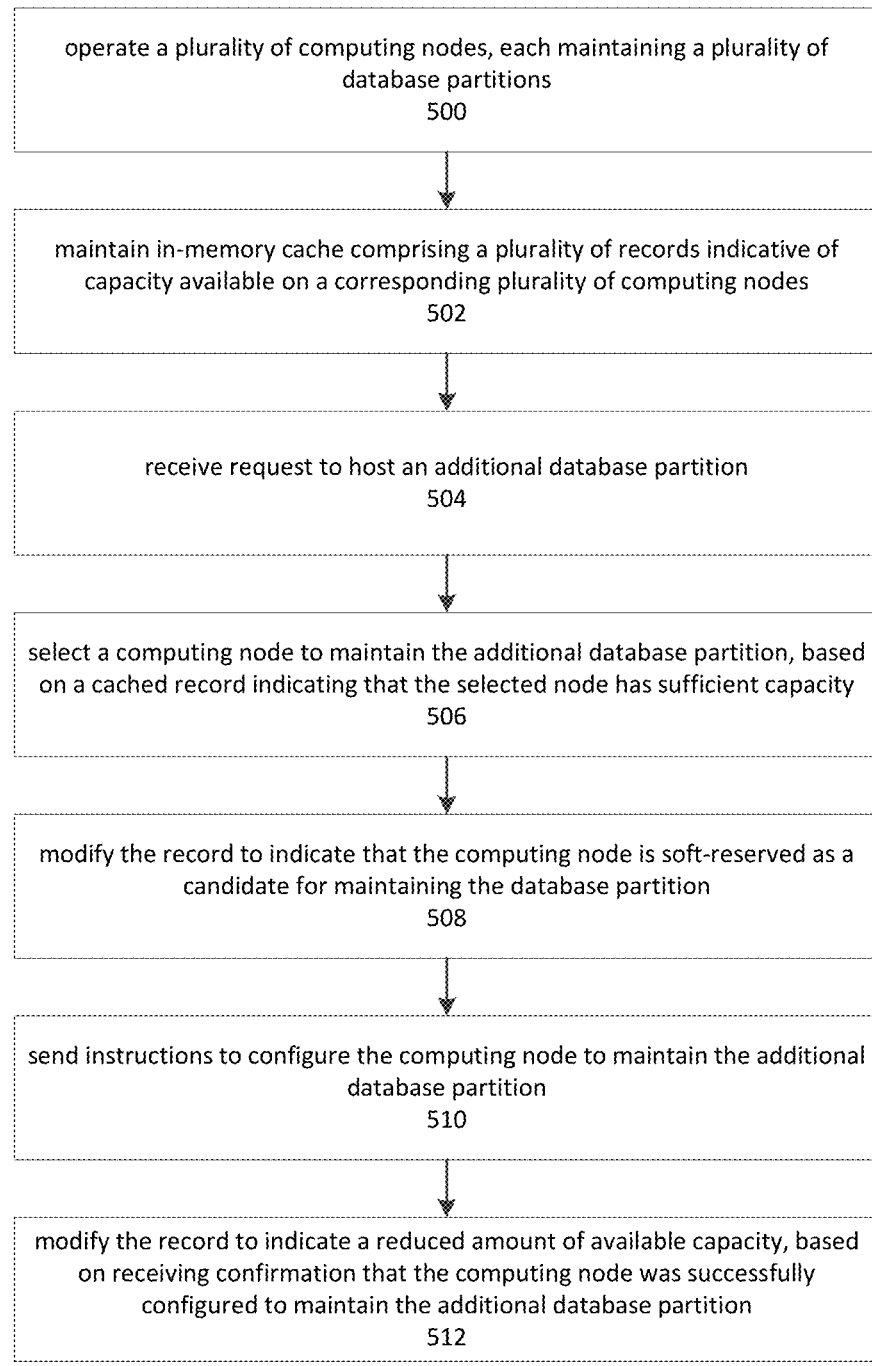
FIG. 5 is a flow diagram depicting an example process of allocating a database partition to a computing node.

FIG. 5 is a flow diagram depicting an example process of allocating a database partition to a computing node. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 500 depicts an embodiment operating a plurality of computing nodes. The computing nodes may be heterogeneous with respect to various properties, such as storage devices, memory capacity, processor speed, and so forth. Each of these computing nodes may maintain a plurality of database partitions. The database partitions may be hosted on behalf of various customers, client devices, and client services. Each database partition may correspond to a collection of data. Maintaining the collection may comprise storing and retrieving data for the database partition. For example, maintaining the collection may, in an embodiment, comprise processing query language commands for inserting, updating, deleting, and retrieving data.

Block 502 depicts an embodiment maintaining an in-memory cache which comprises a plurality of records. Each record of the plurality may correspond to a computing node in a fleet of nodes available for hosting database partitions. In an embodiment, maintenance of the cache may comprise storing and retrieving cache records.

In an embodiment, each record of the cache may correspond to a computing node and may contain information representative of various aspects of the corresponding computing node. These aspects may include capacity utilization data, such as is depicted in FIG. 3, for example. The record may further comprise property information, such as the storage devices, memory capacity, and so forth used on the corresponding computing node.

Block 504 depicts an embodiment receiving a request to host an additional database partition. The request may, for example, comprise data describing or specifying the requested partition. In some cases, the request may be associated with creating a new partition. In other cases, the request may be associated with transferring an existing partition from another location. In some cases, the request may comprise an amount of capacity needed to host the partition. The amount may be estimated, inferred, or in some cases known with some degree of precision. In an embodiment, the amount may be provided in the request. In another embodiment, the amount may be obtained through examination of a existing partition that is to be transferred to the selected computing node.

Block 506 depicts an embodiment selecting a computing node to maintain the additional database partition. The selection may be based on a cached record which indicates that the corresponding computing node has sufficient capacity. In an embodiment, the example process depicted by FIG. 6 may be used to select the computing node.

Block 508 depicts an embodiment modifying the record to indicate that the computing node is soft-reserved as a candidate for maintaining the database partition. As described herein, the record may be modified to indicate the corresponding computing node is soft-reserved, and thus the reservation may be subsequently committed or rolled back.

Block 510 depicts an embodiment sending instructions to configure the computing node to host the database partition. This may comprise operations such as copying partition data to the computing node, estimating required and available capacity, and so forth.

In an embodiment, after the configuration operations complete, the selected computing node may signal that it commits to maintaining the partition. The computing node may locally store information indicating that computing capacity needed for maintaining the partition has been hard-reserved, or in other words that the previous soft-reservation has been committed.

Block 512 depicts an embodiment modifying the record which corresponds to the selected computing node to indicate that the soft reservation has been committed. In an embodiment, this may comprise modifying the record to indicate that it has a reduced amount of available capacity. In an embodiment, the record may be updated based on receiving information confirming that the soft reservation of capacity, as noted in the record, has been made permanent on the selected computing node.

Figure 6:
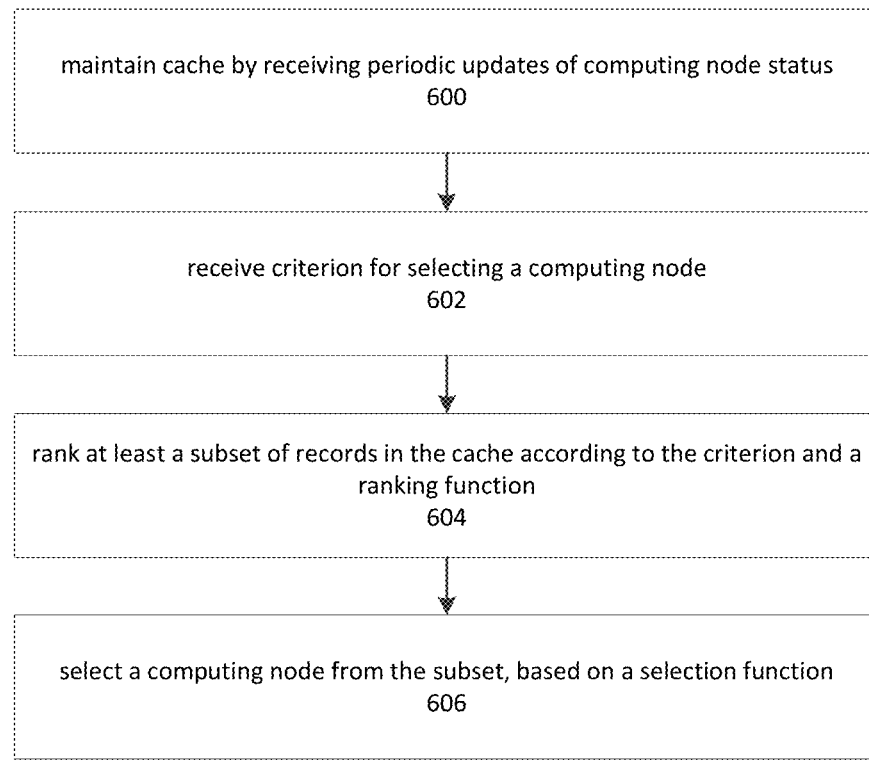
FIG. 6 is a flow diagram depicting an example process of selecting a computing node based on a cache.

FIG. 6 is a flow diagram depicting an example process of selecting a computing node based on a cache. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 600 depicts an embodiment maintaining a cache of records indicative of a fleet of corresponding computing nodes. An aspect of maintaining the cache may, in some embodiments, comprise receiving periodic updates regarding the status of the computing nodes in the fleet. For example, a periodic scan of the fleet may updated capacity information for each of the computing nodes. The scan may indicate that an attempt to conform to a soft-reservation has failed, and that the corresponding soft reservation should be rolled back in the cache.

Block 602 depicts an embodiment receiving a criterion for selecting a computing node to provide a requested computing capacity. For example, a request to maintain a database partition may include a criterion specifying a preferred type of storage device.

Block 604 depicts an embodiment ranking records in the cache according to the criterion and a ranking function. In an embodiment, a cache manager 112 ranks a subset of records in the cache according to the criterion and a ranking function. The ranking function may base the ranking of nodes on conformance to the criterion, available capacity, and other factors. The ranking function may employ a randomization technique so that the subset varies over time. This approach may help to avoid over-committing newer nodes that initially have high available capacity. The ranking function may, for example, apply a random weighting to the cache records so that the outcome of the sorting varies with some degree of randomness.

Block 606 depicts selecting a computing node to be a candidate for providing a requested amount of computing capacity. In an embodiment, the top-ranked computing node is indicated as a candidate for providing the requested amount of computing capacity. This may comprise determining which computing node is top-ranked and storing a result of the determination. In another embodiment, a randomization technique is applied so that the top-ranked node is indicated as the candidate with the greatest probability, the next-ranged node with less probability, and so forth. A selection function may apply other factors and rules, such as those related to the specified criterion, to indicate candidates for providing the requested amount of computing capacity.

Figure 7:
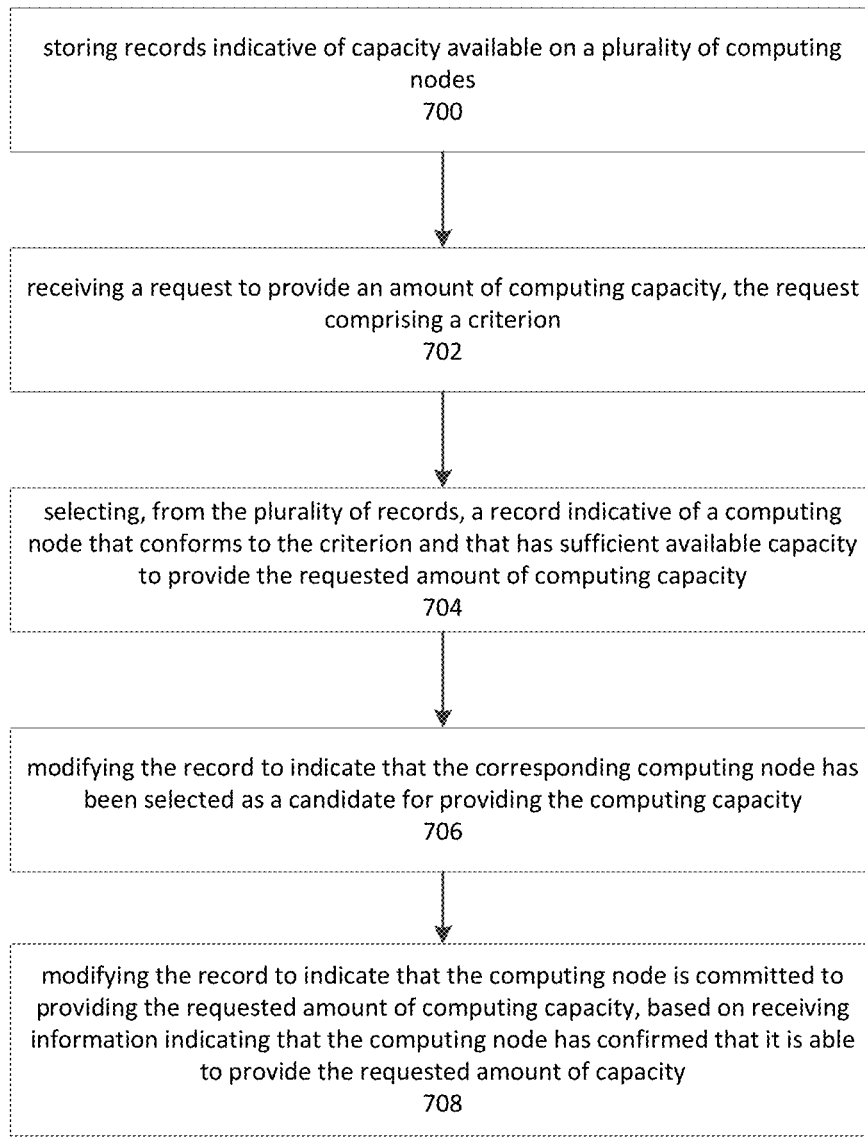
FIG. 7 is a flow diagram depicting an example process of selecting a computing node to provide computing capacity.

FIG. 7 is a flow diagram depicting an example process of selecting a computing node to provide computing capacity. Although depicted as a sequence of blocks, those of ordinary skill in the art will appreciate that the depicted order should not be construed as limiting the scope of the present disclosure to embodiments consistent with the depicted order, and that at least some of the depicted blocks may be altered, omitted, reordered, supplemented with additional elements, or performed in parallel.

Block 700 depicts an embodiment storing records that are indicative of the capacity available on each of a respective computing node. In an embodiment, a cache manager 112 may store a record for each node in the fleet in a single, memory-based cache, as described herein.

Block 702 depicts an embodiment receiving a request to provide an amount of computing capacity. The requested amount may be implicitly or explicitly suggested. For example, in an embodiment an amount of computing capacity is implied by requesting that a computing node be allocated to maintain a database partition. In other instances, an amount of computing capacity may be explicitly requested, for example by specifying a permitted amount of input/output operations per unit of time. The request may also comprise a criterion for selecting a computing node, such as a criterion related to storage device type, available memory, processor speed, and so forth.

Block 704 depicts an embodiment selecting, from the plurality of records, a record which corresponds to a computing node capable of providing the requested capacity. The selected record may thus indicate that the corresponding node is estimated to have sufficient capacity to provide the requested amount of computing capacity. The record may also be selected based on the specified criterion, if any.

Block 706 depicts an embodiment modifying the record to indicate that the computing node has been soft-reserved. As explained herein, the soft-reservation of a computing node may indicate that the computing node is a candidate for providing the computing capacity. Although the computing node is a candidate to provide the capacity, initially the knowledge of the candidacy is available only to the allocation service—the node itself has yet to be notified. Consequently, the selected node may be sent a request to confirm that it is able to provide the requested amount of capacity. In some embodiments, confirmation may be provided once the computing node has been successfully configured to provide the requested capacity.

Block 708 depicts an embodiment modifying the record based on receiving confirmation that the selected node is able to provide the requested amount of computing capacity. The record may therefore be modified by the cache manager 112 to indicate that the previous soft-reservation has been committed, i.e. has been "hard-reserved." This may, in some cases, comprise adjusting elements of the record that are indicative of available capacity. For example, if available capacity was initially X, and an amount Y of additional capacity was requested, the record might be modified to indicate that the available capacity is now X-Y.

In an embodiment, an example method of allocating computing capacity may comprise storing records indicative of an amount of computing capacity available on a respective computing node. The records may represent respective computing nodes in a fleet of nodes. The method may further comprise selecting a record that is indicative of a computing node that has available capacity that is at least as much as the requested amount. The method may further comprise modifying the record to indicate that the computing node is a candidate for providing the requested computing capacity. For example, the record may be modified to indicate that the requested capacity is soft-reserved. The method may further comprise modifying the record to indicate that the soft-reserved capacity has been committed, based at least in part on receiving information confirming that the computing node is able to provide the requested amount of capacity. The confirmation may, in some instances, be based on successful configuration of the computing node to provide the capacity.

In an embodiment, the example method may further comprise receiving information indicative of an updated amount of computing capacity available on each respective computing node, and updating the plurality of records based on the updated amounts. The information may be received from the computing nodes.

In an embodiment, the example method may further comprise sending a command to configure the computing node to provide the requested amount of computing capacity.

In an embodiment, the example method may further comprise configuring the computing node by copying partition data to the computing node.

In an embodiment, the example method may further comprise cache records that include data indicative of an estimated amount of currently utilized capacity, and data indicative of an amount of computing capacity that the computing node is a candidate for providing.

In an embodiment, the example method may further comprise cache records that include data indicative of storage capacity and input/output operations per unit time.

Figure 8:
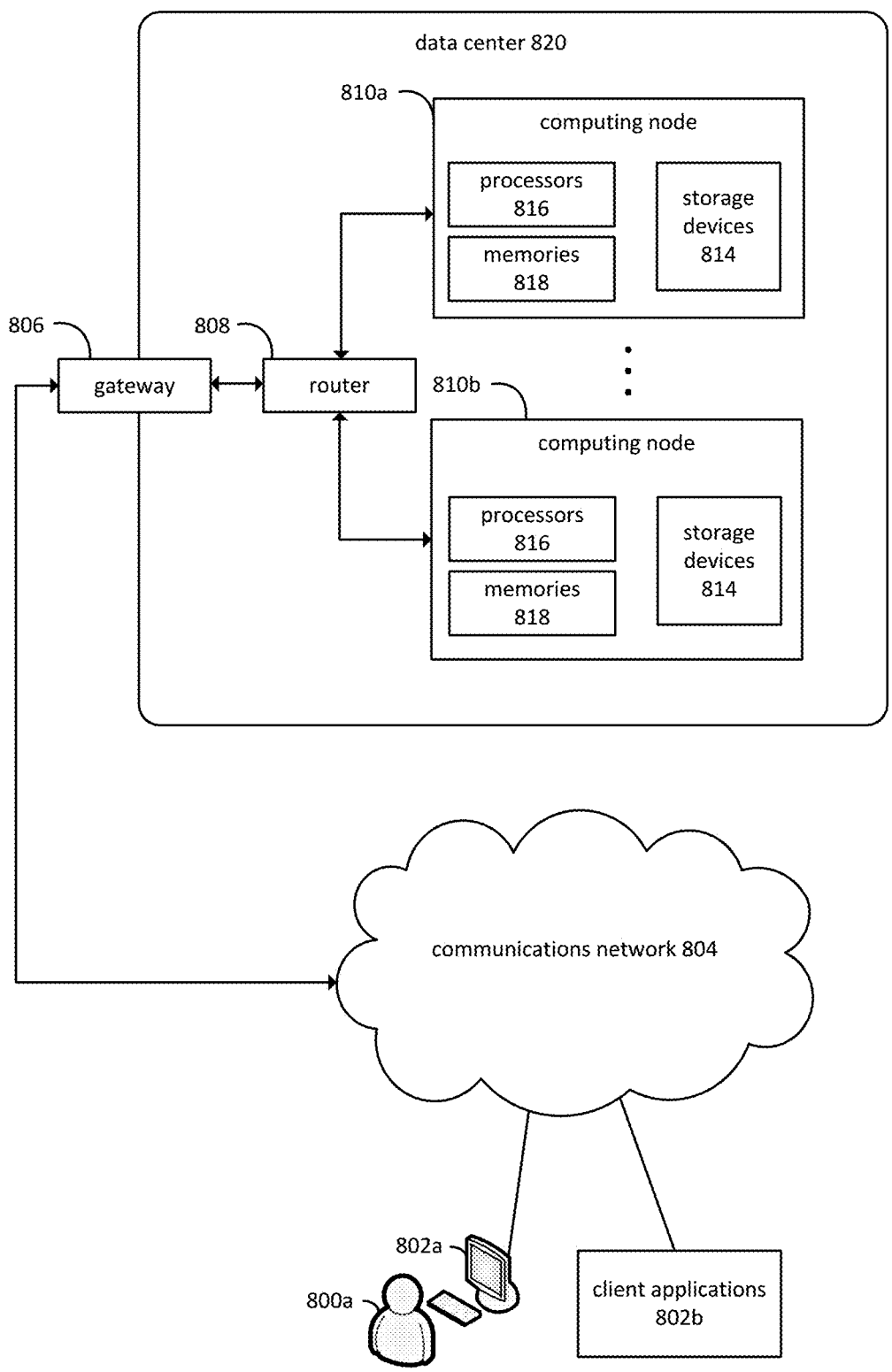
FIG. 8 is a block diagram depicting an embodiment of a computing environment in which aspects of the present disclosure may be practiced.

FIG. 8 is a diagram depicting an example of a distributed computing environment on which aspects of the present invention may be practiced. Various users 800a may interact with various client applications, operating on any type of computing device 802a, to communicate over communications network 804 with processes executing on various computing nodes 810a-810b within a data center 820. Alternatively, client applications 802b may communicate without user intervention. Communications network 804 may comprise any combination of communications technology, including the Internet, wired and wireless local area networks, fiber optic networks, satellite communications, and so forth. Any number of networking protocols may be employed.

Communication with processes executing on the computing nodes 810a-810b, operating within data center 820, may be provided via gateway 806 and router 808. Numerous other network configurations may also be employed. Although not explicitly depicted in FIG. 8, various authentication mechanisms, web service layers, business objects, or other intermediate layers may be provided to mediate communication with the processes executing on computing nodes 810a-810b. Some of these intermediate layers may themselves comprise processes executing on one or more of the computing nodes. Computing nodes 810a-810b and processes executing thereon, may also communicate with each other via router 808. Alternatively, separate communication paths may be employed. In some embodiments, data center 820 may be configured to communicate with additional data centers, such that the computing nodes and processes executing thereon may communicate with computing nodes and processes operating within other data centers.

Computing nodes 810a-810b may comprise physical hardware comprising one or more processors 816, one or more memories 818, and one or more storage devices 814. Processes on computing nodes 810a-810b may execute in conjunction with an operating system or alternatively may execute as a bare-metal process that directly interacts with physical resources, such as processors 816, memories 818, or storage devices 814.

The various computing nodes depicted in FIG. 8 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 9:
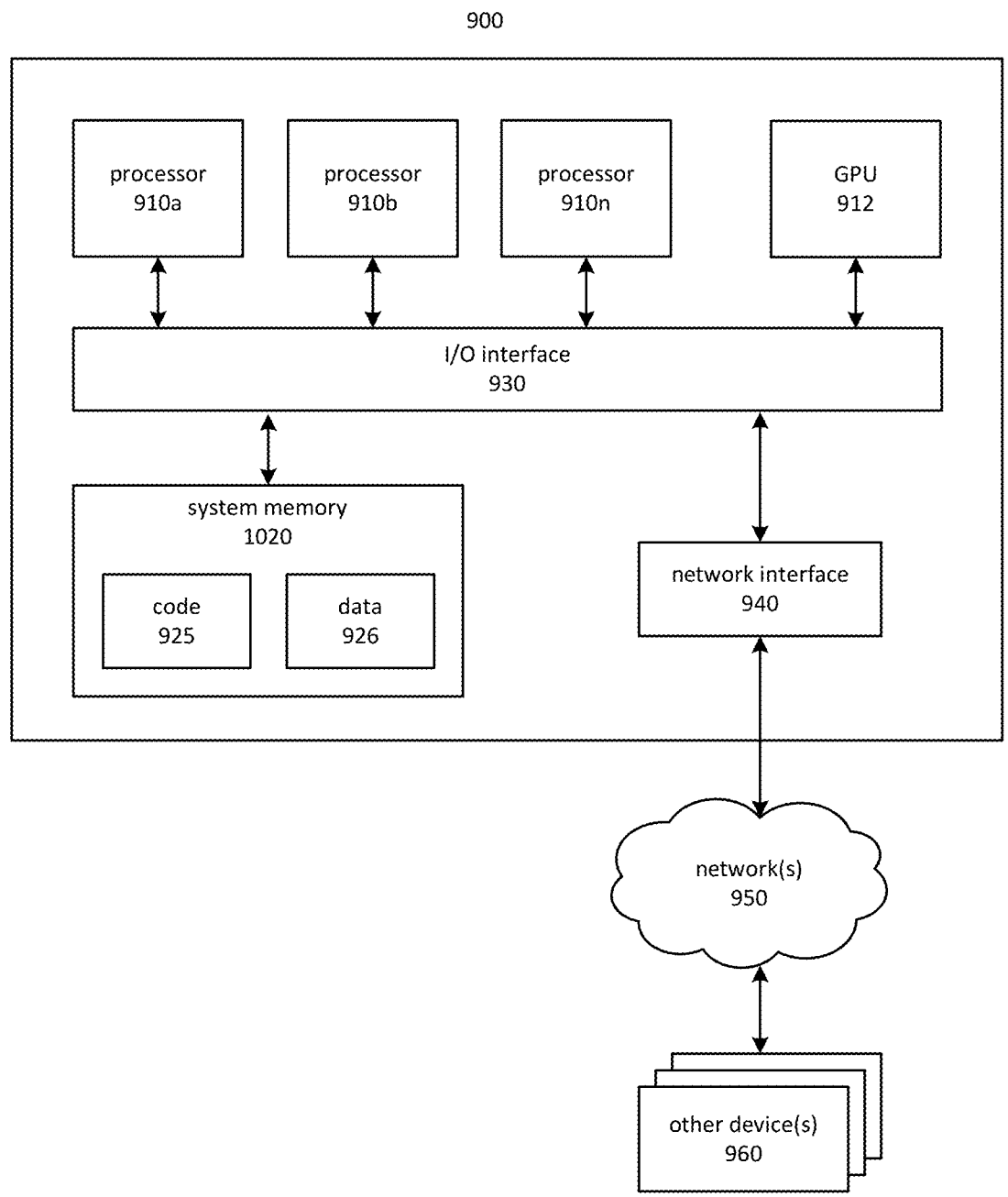
FIG. 9 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. In the illustrated embodiment, computing device 900 includes one or more processors 910a, 910b, and/or 910n (which may be referred herein singularly as a processor 1010 or in the plural as the processors 910) coupled to a system memory 920 via an input/output ("I/O") interface 930. Computing device 900 further includes a network interface 940 coupled to I/O interface 930.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures ("ISAs"), such as the x86, PowerPC, SPARC or MIPS ISAs, or any other suitable ISA. In multiprocessor systems, each of processors 910 may commonly, but not necessarily, implement the same ISA.

In some embodiments, a graphics processing unit ("GPU") 912 may participate in providing graphics rendering and/or physics processing capabilities. A GPU may, for example, comprise a highly parallelized processor architecture specialized for graphical computations. In some embodiments, processors 910 and GPU 912 may be implemented as one or more of the same type of device.

System memory 920 may be configured to store instructions and data accessible by processor(s) 910. In various embodiments, system memory 920 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect ("PCI") bus standard or the Universal Serial Bus ("USB") standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing device 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory, 920 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 900 via I/O interface 930. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals, such as electrical, electromagnetic or digital signals, conveyed via a communication medium, such as a network and/or a wireless link, such as those that may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system, comprising:
   at least one processor; and
   a non-transitory computer-readable medium comprising instructions that, in response to being performed by the at least one processor, cause the system to:
   store at least one record to indicate an estimated capacity and at least one property of at least one computing node of a fleet of computing nodes, the computing nodes having heterogeneous properties;
   modify the at least one record to indicate that the at least one computing node is selected as a candidate from the fleet of computing nodes to store a first database partition based at least in part on the estimated capacity and the at least one property of the at least one computing node, wherein the at least one computing node is indicated as a candidate to store the first database partition prior to hard-reserving capacity sufficient to store the first database partition;
   cause the at least one computing node to store the first database partition on the at least one computing node in response to the at least one computing node being indicated as the candidate to store the first database partition; and
   in response to the at least one computing node storing the first database partition, modify the at least one record to indicate a reduced amount of capacity available to store additional database partitions.

2. The system of claim 1, wherein the at least one computing node determines that capacity to store the first database partition is available, based at least in part on a second partition stored on the at least one computing node.

3. The system of claim 1, wherein the non-transitory computer-readable medium comprises instructions that, in response to being performed by the at least one processor, cause the system to:
   receive a request to store the first database partition, the request comprising the criterion indicative of a processor property of the at least one computing node.

4. The system of claim 3, wherein the non-transitory computer-readable medium comprises instructions that, in response to being performed by the at least one processor, cause the system to:
   rank the at least one record based at least in part on the criterion; and
   select the at least one computing node to store the first database partition, based at least in part on the ranking of the at least one record.

5. The system of claim 1, wherein the non-transitory computer-readable medium comprises instructions that, in response to being performed by the at least one processor, cause the system to:
   update the at least one record based at least in part on capacity information obtained from the at least one computing node.

6. A method, comprising:
   storing at least one record indicative of computing capacity available on one or more computing nodes of a plurality of computing nodes;
   selecting a computing node, from the plurality of computing nodes, as a candidate to provide computing capacity, based at least in part on the at least one record and a property of the computing node, wherein capability of the computing node to provide the computing capacity is unconfirmed when the computing node is selected as a candidate, the property different than another property of at least one other computing node of the plurality of computing nodes;
   modifying the record to indicate that the computing node is a candidate for providing the computing capacity, wherein the computing capacity available on the one or more computing nodes is variable subsequent to the indication;
   causing the computing node to confirm that it is able to provide the computing capacity; and
   modifying the record to indicate reduced available computing capacity in response to receiving the confirmation from the computing node.

7. The method of claim 6, further comprising:
   receiving information indicative of amounts of computing capacity available on the one or more computing nodes; and
   updating the at least one record based on the information indicative of the amounts.

8. The method of claim 6, further comprising:
   causing the computing node to provide the computing capacity.

9. The method of claim 8, wherein the computing node comprises copying partition data to the computing node.

10. The method of claim 6, wherein the record is indicative of computing capacity utilized by the computing node and computing capacity the computing node is a candidate for providing.

11. The method of claim 6, wherein the record is indicative of at least one of storage capacity or input/output operations per unit time.

12. The method of claim 6, further comprising:
    serializing access to the at least one record.

13. The method of claim 6, further comprising:
    selecting the record based at least in part on ranking the at least one record.

14. The method of claim 6, wherein the computing capacity indicated as available by the at least one record is inaccurate.

15. A non-transitory computer-readable medium having stored thereon executable instructions that, upon execution by at least one processor, cause the at least one processor to:
    store at least one record to indicate capacity and a property of at least one computing node of a plurality of computing nodes, the property different than another property of at least one other computing node of the plurality of computing nodes;
    modify the at least one record to indicate that the at least one computing node is selected as a candidate from the plurality of computing nodes to store a first database partition, wherein ability of the at least one computing node to store the first database partition is unconfirmed when the record is indicated as a candidate;
    cause the at least one computing node to store the first database partition; and
    in response to the at least one computing node storing the first database partition, modify the at least one record to indicate a reduced amount of capacity available to store additional database partitions.

16. The non-transitory computer-readable medium of claim 15, having stored thereon executable instructions that, upon execution by the at least one processor, cause the at least one processor to:

cause the at least one computing node to determine an amount of capacity being utilized to store a second partition.

17. The non-transitory computer-readable medium of claim 15, having stored thereon executable instructions that, upon execution by the at least one processor, cause the at least one processor to:
   indicate the at least one computing node to store the first database partition based at least in part on a criterion indicative of a property of the at least one computing node.

18. The non-transitory computer-readable medium of claim 15, having stored thereon executable instructions that, upon execution by the at least one processor, cause the at least one processor to:
   indicate the at least one computing node to store the first database partition based at least in part on a ranking of the at least one computing node compared to a second at least one computing node, based at least in part on the at least one record.

19. The non-transitory computer-readable medium of claim 15, having stored thereon executable instructions that, upon execution by the at least one processor, cause the at least one processor to:
   obtain, for each of the one or more computing nodes, information indicative of capacity available on the respective computing node.

20. The non-transitory computer-readable medium of claim 15, wherein the at least one record is indicative of one or more properties of the one or more computing nodes.

* * * * *